3,147,182
ANTISEPTIC MIXTURE OF DECAMETHYLENE 1,10-BIS-4-AMINOQUINALDINIUM SALT AND CETYL PYRIDINIUM SALT
Joseph Nicholas Masci, Metuchen, and Frederick Herbert Grutter, Highland Park, N.J., assignors to Johnson & Johnson, a corporation of New Jersey
Filed Mar. 20, 1961, Ser. No. 96,742
8 Claims. (Cl. 167—33)

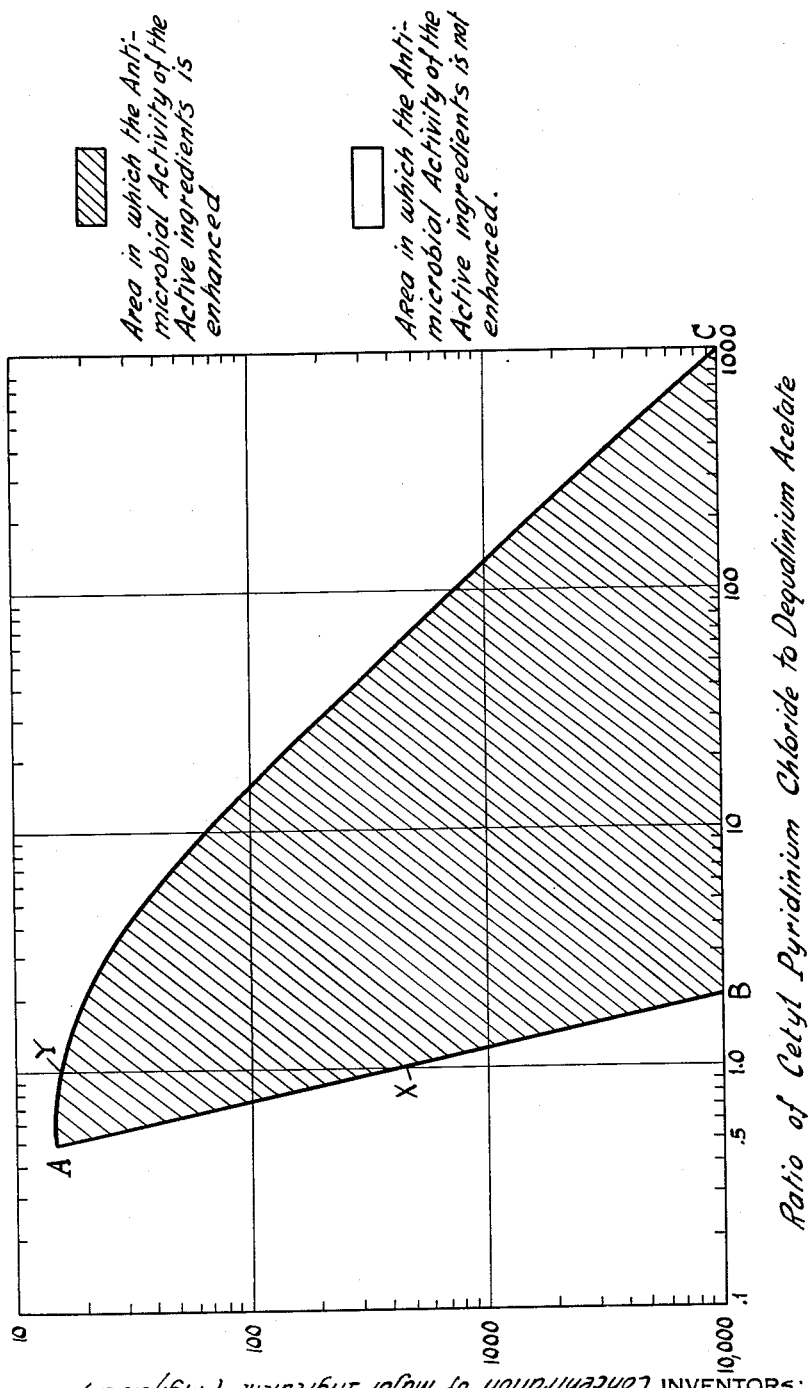

This invention relates to improved compositions of matter for controlling bacteria and other microorganisms and more particularly to compositions of this type which contain a decamethylene 1,10-bis-4-aminoquinaldinium salt as an antimicrobial agent.

Decamethylene 1,10-bis-4-aminoquinaldinium salts, which will be referred to hereinafter as dequalinium salts, and methods for the preparation of these compounds are disclosed in Austin et al. U.S. Patent 2,791,582, issued May 7, 1957. These salts are known to possess a high degree of activity against a wide variety of microorganisms including many which have proven resistant to penicillin. Dequalinium salts are also notable for their ability, rare among antibacterial quaternary ammonium compounds, to retain their activity in the presence of human body fluids. It is apparent, therefore, that dequalinium salts by virtue of their high degree of activity against a broad spectrum of microorganisms and retention of this activity even in the presence of body fluids, stand virtually alone in their value as antimicrobial agents. However, in spite of the general superiority of dequalinium salts their use has been restricted by the complexity of their preparation and consequent high cost which has previously made them uneconomic for use in many applications where they would otherwise be the antimicrobial agents of choice. The use of dequalinium salts in preparations or articles for oral use such as mouth washes, tooth pastes, gingival paints, dental aids and the like has also been limited by the extremely bitter taste of these materials which has previously necessitated the use of very small concentrations of dequalinium salts in such applications. It is, therefore, an object of the present invention to make practicable the use of dequalinium salts as antimicrobial agents in applications where this has previously been uneconomic.

It is a further object of the invention to reduce the amount of dequalinium salt required in an antimicrobial composition to achieve the desired degree of antimicrobial activity.

It is still another object of the invention to enhance the antimicrobial activity of compositions containing dequalinium salts.

It is another object of the invention to make practicable the use of dequalinium salts in oral preparations.

It is a further object of the invention to reduce the total concentration of antimicrobial quaternary ammonium salts required to provide a desired level of antimicrobial activity in compositions containing these salts.

The present invention, by means of which the above and other objects are achieved, is based upon the surprising discovery that when cetyl pyridinium salts are incorporated in compositions containing dequalinium salts in critical concentrations and ratios, the antimicrobial activity of the dequalinium salts is unexpectedly enhanced. Inasmuch as the cetyl pyridinium salts are relatively inexpensive, both the concentration of dequalinium salt required to obtain the desired level of antimicrobial activity and the cost of a composition containing such a salt can be substantially reduced by the addition of a cetyl pyridinium salt. It is apparent, therefore, that the present invention substantially increases the utility of dequalinium salts since it makes their use feasible in applications for which they were previously too expensive or where their characteristic bitter taste previously prohibited their use in effective concentrations. As will be described more fully below the invention also makes possible under certain circumstances, a reduction in the total concentration of quaternary ammonium salts required to achieve a desired level of antimicrobial activity.

The dequalinium salts which are useful in the invention are composed of a decamethylene 1,10-bis-4-aminoquinaldinium cation containing two quaternary nitrogen atoms, each associated with a suitable anion. The antimicrobial activity of the dequalinium salts appears to be primarily attributable to the cation. The identity of the anions is not critical although it is preferable that they not be large enough to cause incompatibility or insolubility. Suitable anions include the halides and the methosulfate, nitrate and acetate ions among others; the acetate and chloride ions being preferred.

The cetyl pyridinium salts useful in the invention are well known antibacterial agents which are described in Shelton U.S. Patent 2,295,504, issued September 8, 1942. Although the antibacterial activity of these salts is apparently due primarily to the cation, the anion has been found to exhibit a marked influence on the solubility, toxicity and bactericidal activity of the compounds. Therefore, although any suitable anion may be employed, preferred anions for the purposes of the present invention include the nitrate, sulfate, salicylate, benzoate, acetate and halide ions among others; the chloride and acetate ions being preferred.

Preferred antimicrobial compositions of the invention comprising, for example, dequalinium acetate in combination with cetyl pyridinium chloride, may be determined by referring to the drawing. The drawing constitutes a graph in which the ratio of the concentration of cetyl pyridinium chloride to the concentration of dequalinium acetate in each of a large number of compositions containing the active ingredients is plotted on the horizontal axis. Similarly, the concentration of the active ingredient present in the larger proportion in each of the compositions is plotted on the vertical axis. Logarithmic scales are employed on both axes for greater clarity due to the wide ranges of concentration and ratio involved.

The curve ABC encompasses all points on the graph representing compositions in which the concentrations of dequalinium acetate and cetyl pyridinium chloride and the ratio of the concentration of the cetyl pyridinium chloride to the concentration of the dequalinium acetate are such that the antimicrobial activity of the dequalinium acetate is unexpectedly enhanced. Points outside of the curve ABC represent compositions containing the active ingredients at concentrations and ratios at which the cetyl pyridinium chloride does not materially enhance the antimicrobial activity of the dequalinium acetate.

The present invention contemplates antimicrobial compositions of any type containing a dequalinium salt and, as a potentiator therefor, a cetyl pyridinium salt. This includes, but is not limited to, topical antiseptics for the control of bacteria in the mouth, gingival paints and other special purpose antiseptics, dentrifices, ointments and powders, dental articles such as cotton rolls, pledgets, sponges, cones and points, antiseptic throat lozenges, personal deodorants, vaginal douches, cold sterilizing solutions and the like.

The concentrations and ratios of the active antimicrobial ingredients which are useful or appropriate in the myriad applications for which the invention is adapted will vary widely. In general antimicrobial compositions of the present invention will contain a dequalinium salt and a cetyl pyridinium salt each in concentrations of about 0.005 to 0.5 percent by weight of the total composition. The total concentration of the two active ingredients in the compositions will consequently be about 0.01 to 1 percent, although rarely above about 0.5 percent by weight. The lower limit of the range of total concentration of the active ingredients is determined by the least amount required to give a useful degree of antimicrobial activity. The upper limit of the range of total concentration of active ingredients is also determined by practical considerations. In general, 0.5 percent total concentration of the antimicrobial agents of the invention is sufficient to provide the desired degree of antimicrobial activity, higher concentrations in general being unnecessary and uneconomical although as much as 1 percent of the combined active ingredients may be used with advantage in some cases. Concentrations above about 1 percent are generally neither economic nor advantageous. The limits of the concentration ranges of the individual active ingredients in the compositions of the invention are determined within the range of total concentration of active ingredients by the ratios of the concentration of one ingredient to the concentration of the other ingredient at which the antimicrobial activity of the dequalinium salt is enhanced.

The ratio of cetyl pyridinium salt to dequalinium salt in the compositions of the invention can vary from about 0.5 to 1000:1. It is apparent, therefore, that in only a small portion of this broad range, i.e., from about 0.5 to 1:1, the dequalinium salt is the major active ingredient in the compositions. In the larger portion of the range of ratios of cetyl pyridinium salt to dequalinium salt, i.e., from 1:1 up to about 1000:1, the cetyl pyridinium salt is the major ingredient. The ratios of cetyl pyridinium salt to dequalinium salt, at which the antimicrobial activity of the dequalinium salt is enhanced, vary with the concentrations of the individual active ingredients. It is difficult, therefore, to express in words the complex relationships which exist between the two active ingredients in all of the compositions in which the benefits of the invention are obtained and yet exclude compositions in which the antimicrobial activity of the dequalinium salt is not enhanced. The invention can, however, be described with convenience and accuracy with the aid of a curve such as ABC as shown in the accompanying drawing.

The concentrations and ratios of cetyl pyridinium chloride and dequalinium acetate which must be present in antimicrobial compositions containing these salts as the active ingredients in order to enhance the antimicrobial activity of the dequalinium acetate can be determined by reference to the drawing. For example, having chosen the total concentration of antimicrobial agents appropriate to the type of antimicrobial composition to be formulated, the ratios of cetyl pyridinium chloride to dequalinium acetate which provide potentiation of the antimicrobial activity of the dequalinium acetate at the preselected total concentration of combined antimicrobial agents can be read from the graph. In cases where the concentration of the dequalinium acetate is predetermined by practical considerations such as cost, taste or the like, the formulator need only refer to the area inside the curve ABC to obtain the operable ratios and thereby the concentrations of cetyl pyridinium chloride which will give the desired potentiation of the antimicrobial activity of the dequalinium acetate. Having referred to the drawing to determine the range of ratios of the concentrations of the active ingredients which will provide the desired potentiation, the optimum ratio for a proposed antimicrobial composition can be determined readily by routine experimentation or considerations of cost. Since, in most cases, the amount of dequalinium salt is most critical due to its high cost, bitter taste, etc., the concentration level of dequalinium salt is often predetermined. The vertical axis of the graph gives the concentration of dequalinium salt directly in the area AXY. In the area XYCB, the concentration of dequalinium salt is equal to the mg./liter shown on the vertical axis divided by the ratio(s) selected on the horizontal axis.

The antimicrobial activity of dequalinium and cetyl pyridinium salts and compositions of the invention containing these salts in combination is measured by a standard disc halo test according to the method of section 141a.1, pages A–1 through A–4, of volume 1 of Compilation of Regulations for Tests and Methods of Assay and Certification of Antibiotic and Antibiotic-containing Drugs (Food and Drug Administration of the U.S. Dept. of Health, Education, and Welfare). According to this method, agar plates are prepared by adding 10 ml. of a base layer of Bacto nutrient agar (available from Difco Laboratories, Inc.) to a petri plate and allowing it to solidify. A seed layer is formed on top of the first layer of agar by adding 4 ml. of inoculated agar to the plate and allowing it to solidify in turn. The seed agar contains 1 ml. of a 24-hour nutrient broth culture of *Staphylococcus aureus* 209 per 150 ml. of agar. Filter paper discs (Schleicher & Schnell, No. 740–E, 12.7 mm. diameter) are dipped into the solution to be tested and then placed on the surface of the agar plates. The plates are incubated at 37° C. for 24 hours and the diameter of the zone of inhibition of growth of *Staphylococcus aureus* 209 is measured to the nearest 0.5 mm. Each diameter or area of zone of inhibition recited in this specification is the average value obtained from three identical disc halo tests. A 0.1 percent solution of a control germicide, mercuric chloride, gives a 19.8 mm. halo under the above test conditions.

The range of the concentrations of dequalinium acetate and cetyl pyridinium chloride and the range of ratios of the concentration of the latter to the concentration of the former which provide a significant degree of potentiation of the antimicrobial activity of dequalinium acetate were determined according to the above method by testing aqueous solutions containing the two active ingredients in a wide range of concentrations and ratios. In addition, the antimicrobial activity of dequalinium acetate and cetyl pyridinium chloride individually was determined in the same manner at the concentrations in which the individual ingredients were present in each of the two component mixtures tested. Experimental error in reading the diameters of the zones of inhibition of bacterial growth is believed to be within ±0.5 mm. Therefore, when the average diameter of the zones of inhibition of bacterial growth obtained in three replicates exceeded by 0.5 mm. the diameter of the zone of inhibition produced by either dequalinium acetate or cetyl pyridinium chloride when tested alone at the concentration at which that salt was present in the mixture, it was considered that the antimicrobial activity of the dequalinium acetate was potentiated by the presence of the cetyl pyridinum chloride. In order to obviate any question whatsoever as to the existence of a potentiating effect results of the series of tests described above were recorded only for tests in which the average diameter of the zone of inhibition produced by the two-component test solution was 0.7 mm. greater than the diameter of the larger of the two zones of inhibition produced by the individual active ingredients when tested at the concentrations in which they were present in the mixture. Solutions containing dequalinium acetate and cetyl pyridinium chloride in certain concentrations and ratios failed to produce zones of inhibition of greater diameter than the larger of the two zones produced by the active ingredients when tested individually at the concentration present in the mixture. These solutions did not exhibit potentiation and, therefore, were considered to be outside the scope of the invention. The results obtained by testing over 300 different aqueous solutions containing dequalinium acetate and cetyl pyridinium chloride in a wide range of concentrations and ratios are summarized in Table I below.

The concentration, expressed in mg./liter, of the ingredient present in major proportion in each of the two-component solutions tested appears at the head of Table I. These concentrations range from 10 mg./liter up to 10,000 mg./liter or stated differently, from about 0.001 to 1 percent by weight of the total composition. The ratio of the concentration of cetyl pyridinium chloride to the concentration of dequalinium acetate in each of the solutions tested appears in the column at the left side of Table I. These ratios range from 0.01 to $10^5$:1. Solutions containing the active ingredients in concentrations and ratios which exhibited potentiation of the antimicrobial activity of the dequalinium acetate are designated by placing one of the letters A, B or C in the appropriate block in the table. The letter A indicates that the diameter of the zone of inhibition produced by the test solution exceeded by at least 0.7 mm. the diameter of the larger of the two zones of inhibition produced by the individual ingredients alone. Similarly, the letter B indicates that the two-component test solution produced a zone of inhibition having a diameter at least 1.0 mm. greater than the diameter of the larger of the two zones produced by the active components alone. The letter C designates compositions showing even greater potentiation of the activity of the dequalinium acetate; the increase in diameter of the zone of inhibition produced by the two-component solution being at least 1.5 mm. greater than the diameter of the larger of the zones obtained with the individual active ingredients.

TABLE I

| Ratio of the Concentration of Cetyl Pyridinium Chloride to the Concentration of Dequalinium Acetate | Concentration of Major Ingredient (mg./liter) | | | | | | | | | | | |
|---|---|---|---|---|---|---|---|---|---|---|---|---|
| | 10,000 | 2,000 | 1,000 | 400 | 250 | 100 | 50 | 40 | 30 | 20 | 15 | 10 |
| .01 | | | | | | | | | | | | |
| .0167 | | | | | | | | | | | | |
| .033 | | | | | | | | | | | | |
| .05 | | | | | | B | | | | | | |
| .067 | | | | | | A | | | | | | |
| .08 | | | | | | A | | | | | | |
| .125 | | | | | | | | B | | | | |
| .25 | | | | | | B | | A | A | A | | |
| .5 | B | A | A | B | | A | A | B | B | A | | |
| 1 | C | C | | A | A | A | B | A | A | B | A | |
| 2 | | B | A | B | B | C | C | B | | | | |
| 4 | B | B | B | C | C | C | B | C | A | B | | |
| 8 | B | C | A | C | C | B | B | C | | B | | |
| 12.5 | C | A | A | C | C | B | A | C | | A | | |
| 15 | C | C | A | B | C | A | | | | | | |
| 20 | C | C | A | C | B | | | | | | | |
| 30 | C | C | | B | B | | | | | | | |
| 60 | C | C | B | | | | | | | | | |
| 100 | C | C | B | | | | | | | | | |
| 200 | C | A | | | | | | | | | | |
| 400 | C | | | | | | | | | | | |
| 1,000 | B | B | | | | | | | | | | |
| 2,000 | | | | | | | | | | | | |
| 10,000 | | | | | | | | | | | | |
| 20,000 | | | | | | | | | | | | |
| $10^5$ | | | | | | | | | | | | |

The curve ABC of the drawing is derived by plotting the data in Table I and drawing a smooth curve enclosing the points representing compositions containing dequalinium acetate and cetyl pyridinium chloride in concentrations and ratios at which the antimicrobial activity of the dequalinium acetate is enhanced by the cetyl pyridinium chloride. The resulting curve closely approximates the experimental facts of Table I and thus affords a reasonable accurate means for predicting in advance of testing whether or not a proposed composition containing dequalinium acetate and cetyl pyridinium chloride will be found to have greater antimicrobial activity than would be expected from the concentration of dequalinium acetate present. Although compositions containing dequalinium and cetyl pyridinium salts other than dequalinium acetate and cetyl pyridinium chloride will not produce curves exactly coincident with the curve ABC of the drawing, the variations will be negligible for practical purposes. Therefore, the curve ABC may be considered generally applicable to all compositions of the invention.

It should be recognized, of course, that the curve ABC although based on a large number of experiments, should not be considered to define the limits of the invention with absolute precision. It has been observed that a few compositions which plot inside curve ABC do not exhibit any marked enhancement of the antimicrobial activity of dequalinium acetate while a few compositions which fall outside of the curve do enhance this activity. Some exceptions to the scope of the curve ABC are found in the area outside of the curve where the ratio of cetyl pyridinium chloride to dequalinium acetate is 1:1 or less. Although these compositions exhibit potentiation of the activity of dequalinium acetate, they are generally of little practical utility. These compositions may be divided into two groups. One group is made up of compositions containing about 400 to 10,000 mg./liter of dequalinium acetate which, consequently, are too expensive for most applications. The second group is made up of compositions which contain about 40 mg./liter of dequalinium acetate at a cetyl pyridinium chloride to dequalinium acetate ratio of 0.5:1 or less. The total concentration of active quaternary ammonium salts in these compositions is less than about 60 mg./liter which is too low to provide sufficient antimicrobial activity for most purposes. Therefore, the area within the curve ABC represents, with reasonable accuracy, substantially all of the compositions of the invention which have economic utility.

The invention will now be illustrated in greater detail by the following specific example of a preferred embodiment.

*Example 1*

An effective oral antiseptic or mouth wash can be formulated by mixing the following ingredients in the proportions listed below:

| | Percent by weight |
|---|---|
| Dequalinium acetate | 0.002 |
| Cetyl pyridinium chloride | 0.025 |
| Ethyl alcohol (95%) | 15 |
| Oil of peppermint | 0.01 |
| Menthol | 0.007 |
| Water to make | 100 |

An aqueous solution containing dequalinium acetate and cetyl pyridinium chloride in the concentrations and proportion recited above was tested according to the standard disc halo test described previously and the results compared with the antimicrobial activity of the individual active ingredients at the concentrations at which they were individually present in the aqueous solution. The results of these tests are set out in Table II below.

TABLE II

| Concentration (mg./liter) | | Zone of Inhibition | |
|---|---|---|---|
| Cetyl Pyridinium Chloride | Dequalinium Acetate | Average Diameter (mm.) | Average Area (mm.²) |
| 250 | 0 | 16.3 | 82 |
| 0 | 20 | 15.1 | 52 |
| 250 | 20 | 18.6 | 143 |
| 400 | 0 | 16.5 | 87 |
| 20 | 0 | 13.0 | 3 |

The average diameters expressed in Table II above include the diameter of the filter paper disc (12.7 mm.) used in the tests. The zones of inhibition obtained in the disc halo tests are roughly circular and, therefore, the area of these zones attributable to the activity of the test solutions can be determined conveniently using the formula for the area of a circle ($A = \pi R^2$ where R is the radius of the circle) by calculating the area of the entire zone of inhibition and subtracting the area of the filter paper disc. The average areas expressed in Table II were calculated in this way. For example, the composition containing 250 mg./liter of dequalinium acetate produced a total zone of inhibition having a diameter of 18.6 mm. and a radius of 9.3 mm. Applying the formula for the area of a circle the total area of the zone of inhibition is calculated to be about 270 mm.². Subtracting the area of the filter paper disc (about 127 mm.²) the area of the concentric zone of inhibition is found to be about 143 mm.².

The data in Table II illustrate the unexpected enhancement of the antimicrobial activity of dequalinium acetate which is characteristic of the compositions of the present invention. The composition, containing 250 mg./liter of cetyl pyridinium chloride and 20 mg./liter of dequalinium acetate is suitable for use as an oral antiseptic or mouth wash since, by virtue of its content of dequalinium acetate, it has a broad spectrum of antimicrobial activity and is not inactivated by saliva in the mouth. As noted above, however, it is desirable to minimize the concentration of dequalinium acetate in such a composition because of its cost and extremely bitter taste. Table II shows that an aqueous solution containing 20 mg./liter of dequalinium acetate alone gives a zone of inhibition of 52 mm.². Although it would be desirable to obtain a larger zone of inhibition, this cannot be done by increasing the concentration of dequalinium acetate for reasons of taste and cost. An aqueous solution containing 250 mg./liter of cetyl pyridinium chloride alone gives a zone of inhibition of 82 mm.² which is somewhat larger than that obtained with the dequalinium acetate alone. Increasing the concentration of cetyl pyridinium chloride to 400 mg./liter gives a zone of inhibition of 87 mm.² which is only slightly larger than the zone (82 mm.²) obtained with 250 mg./liter of cetyl pyridinium chloride. It is apparent, therefore, that neither cetyl pyridinium chloride nor dequalinium acetate alone can provide a zone of inhibition greater than about 87 mm.² at concentrations suitable for use in a mouth wash. This problem is solved by the surprising discovery that when dequalinium acetate and cetyl pyridinium chloride are combined in an aqueous solution at the same concentrations, 20 mg./liter and 250 mg./liter respectively, the solution gives a zone of inhibition of 143 mm.² which is substantially larger than the zones produced by the ingredients when tested individually at these concentrations. It is apparent, therefore, that the activity of the two-component solution is substantially greater than would be expected from the activities of the individual ingredients.

As noted above the present invention has wide application in the antiseptic field being useful in the formulation of all types of antimicrobial compositions. The majority of these compositions will, of course, contain water which as is well known must necessarily be present in order to obtain antimicrobial activity from the quaternary ammonium salts employed in the present invention. It should be noted, however, that the dequalinium and cetyl pyridinium salts may be incorporated in dry compositions such as antiseptic dusting powders and the like since products of this type will normally be exposed to moisture in use and thus will become effective antimicrobial preparations. The active ingredients of the present invention may also be incorporated in or applied to articles such as dental aids and the like including cotton rolls, pledgets, sponges, cones and points or similar articles composed of cellulose or other materials. The antibacterial agents employed in the invention have been found to adsorb to some degree on cellulose and, therefore, must be adjusted in concentration to compensate for the amount adsorbed. The majority of the antiseptic compositions incorporating the active ingredients of the invention will, however, be aqueous solutions. Such solutions may contain substantial amounts of other materials such as alcohol, glycerin and the like or any other substance which does not destroy the antimicrobial activity of the compositions. The invention, therefore, contemplates the recited combinations of the active ingredients either by themselves or incorporated in any pharmaceutically acceptable carrier.

The term "antimicrobial activity" employed herein is used in the broadest sense and includes but is not limited to microbiocidal, microbiostatic, germicidal, antiseptic and prophylactic activity.

Although the invention has been described for purposes of illustration as involving the potentiation or enhancement of the antimicrobial activity of dequalinium salts by cetyl pyridinium salts, it is equally plausible to explain the unexpected activity of the combinations of active ingredients as potentiation of the activity of the cetyl pyridinium salts by the dequalinium salts. Other explanations are also possible and, therefore, the scope of the invention is not to be limited by the theory of operation presented herein. Further, inasmuch as the invention is susceptible of many modifications within its spirit, it is to be limited only by the scope of the appended claims.

What is claimed is:

1. A composition for the control of microorganisms which comprises a water soluble decamethylene 1,10-bis-4-aminoquinaldinium salt and a cetyl pyridinium salt; the concentration of each of said salts and the ratio of the concentration of one salt to the concentration of the other salt in said composition being such that the composition is represented by a point within the area enclosed by curve ABC in the accompanying drawing, said composition having a useful degree of antimicrobial activity in the presence of moisture.

2. A dental article comprising a cellulosic material containing an available amount of a composition of claim 1.

3. A composition for the control of microorganisms which comprises a water soluble decamethylene 1,10-bis-4-aminoquinaldinium salt and a cetyl pyridinium salt in a pharmaceutically acceptable carrier; the concentration of each of said salts and the ratio of the concentration of one salt to the concentration of the other salt in said composition being such that the composition is represented by a point within the area enclosed by curve ABC in the drawing, said composition having a useful degree of antimicrobial activity in the presence of mosture.

4. A composition of claim 3 in which the pharmaceutically acceptable carrier is an aqueous solution.

5. A composition of claim 3 in which the pharmaceutically acceptable carrier is a dusting powder.

6. An oral antiseptic composition comprising a water soluble decamethylene 1,10-bis-4-aminoquinaldinium salt and a water soluble cetyl pyridinium salt as the active ingredients; the concentration of each of said salts and the ratio of the concentration of one to the concentration of the other being such that the composition is represented by a point within the area enclosed by the curve ABC in the accompanying drawing, said composition having a useful degree of antimicrobial activity in the presence of moisture.

7. An oral antiseptic composition comprising about 0.002 percent of a water soluble decamethylene 1,10-bis-4-aminoquinaldinium salt and about 0.025 percent of a water soluble cetyl pyridinium salt by weight of the composition as the active ingredients, said composition having a useful degree of antimicrobial activity in the presence of moisture.

8. An oral antiseptic composition comprising in aqueous solution about 0.002 percent of decamethylene 1,10-bis-4-aminoquinaldinium acetate, about 0.025 percent of cetyl pyridinium chloride, about 15 percent of ethyl alcohol (95%), about 0.01 percent of oil of peppermint and about 0.007 percent of menthol by weight of the total composition, said composition having a useful degree of antimicrobial activity in the presence of moisture.

References Cited in the file of this patent

UNITED STATES PATENTS

| | | |
|---|---|---|
| 2,295,504 | Shelton | Sept. 8, 1942 |
| 2,479,850 | Marks | Aug. 23, 1949 |
| 2,791,582 | Austin | May 7, 1957 |
| 2,921,885 | Bouchal | Jan. 19, 1960 |
| 2,951,787 | Cicero | Sept. 6, 1960 |
| 2,951,788 | Lo | Sept. 6, 1960 |

FOREIGN PATENTS

| | | |
|---|---|---|
| 155,302 | Australia | Feb. 19, 1954 |

OTHER REFERENCES

Lesser: Drug and Cosmetic Industry, April 1949, pp. 434–436, 518 and 521.

Journal of American Pharmaceutical Assn., September 1957, pp. 524–531.